United States Patent [19]
Nagashima et al.

[11] Patent Number: 6,017,836
[45] Date of Patent: *Jan. 25, 2000

[54] ULTRAVIOLET AND INFRARED RADIATION ABSORBING GLASS

[75] Inventors: Yukihito Nagashima; Koichi Sakaguchi; Takashi Uchino, all of Osaka, Japan

[73] Assignee: Nippon Sheet Glass Co., Ltd., Osaka, Japan

[*] Notice: This patent is subject to a terminal disclaimer.

[21] Appl. No.: 08/657,202

[22] Filed: Jun. 3, 1996

[30] Foreign Application Priority Data

Jun. 2, 1995 [JP] Japan .................................. 7-136386
Apr. 10, 1996 [JP] Japan .................................. 8-088040

[51] Int. Cl.$^7$ ........................... C03C 3/087; C03C 3/095
[52] U.S. Cl. .............................. 501/64; 501/66; 501/70; 501/904; 501/905
[58] Field of Search ................... 501/65, 66, 70, 501/71, 64, 904, 905

[56] References Cited

U.S. PATENT DOCUMENTS

| | | |
|---|---|---|
| 2,974,052 | 7/1961 | Bacon et al. . |
| 3,294,556 | 12/1966 | Harrington ................................. 501/71 |
| 4,190,452 | 2/1980 | Fischer et al. . |
| 4,792,536 | 12/1988 | Pecoraro et al. . |
| 4,866,010 | 9/1989 | Boulos et al. . |
| 5,030,593 | 7/1991 | Heithoff . |
| 5,077,133 | 12/1991 | Cheng ........................................ 501/70 |
| 5,112,778 | 5/1992 | Cheng et al. ............................. 501/31 |
| 5,214,008 | 5/1993 | Beckwith et al. . |
| 5,240,886 | 8/1993 | Gulotta et al. . |
| 5,264,400 | 11/1993 | Nakaguchi et al. ....................... 501/70 |
| 5,318,931 | 6/1994 | Nakaguchi et al. ....................... 501/70 |
| 5,344,798 | 9/1994 | Morimoto et al. . |
| 5,372,977 | 12/1994 | Mazon-Ramos et al. . |
| 5,380,685 | 1/1995 | Morimoto et al. ....................... 501/71 |
| 5,385,872 | 1/1995 | Gulotta et al. ............................ 501/71 |
| 5,478,783 | 12/1995 | Higby et al. .............................. 501/27 |
| 5,545,596 | 8/1996 | Alvarez-Casariego et al. .......... 501/71 |
| 5,723,390 | 3/1998 | Kijima et al. ............................. 501/70 |
| 5,763,342 | 6/1998 | Mita et al. ................................. 501/71 |
| 5,776,845 | 7/1998 | Boulos et al. ............................. 501/71 |
| 5,776,846 | 7/1998 | Sakaguchi et al. ....................... 501/71 |
| 5,830,812 | 11/1998 | Shlestak et al. .......................... 501/71 |
| 5,858,894 | 1/1999 | Nagashima et al. ...................... 501/64 |
| 5,858,896 | 1/1999 | Nagashima et al. ...................... 501/64 |

FOREIGN PATENT DOCUMENTS

| | | |
|---|---|---|
| 0604314 | 6/1994 | European Pat. Off. . |
| 2074983 | 9/1971 | France . |
| 2690437 | 11/1993 | France . |
| 57-106537 | 7/1982 | Japan . |
| 3187946 | 8/1991 | Japan . |
| 4231347 | 8/1992 | Japan . |
| 270138 | 9/1992 | Japan . |
| 656466 | 3/1994 | Japan . |
| 6191880 | 7/1994 | Japan . |
| 1168769 | 10/1969 | United Kingdom . |
| 2162835 | 2/1986 | United Kingdom . |
| WO-9107356 | 5/1991 | WIPO . |

OTHER PUBLICATIONS

St–Ceramics, vol. 98, 1983, p. 177 No month.
Coloured Glasses, Weyl, Reprint 1992, pp. 18–19, 138–142, No month.

*Primary Examiner*—Karl Group
*Attorney, Agent, or Firm*—Sughrue, Mion, Zinn Macpeak & Seas, PLLC

[57] ABSTRACT

Ultraviolet and infrared radiation absorbing glass comprising, as basic glass components, 65 to 80% by weight of $SiO_2$, 0 to 5% by weight of $Al_2O_3$, 0 to 10% by weight of MgO, 5 to 15% by weight of CaO, 10 to 18% by weight of $Na_2O$, 0 to 5% by weight of $K_2O$, 5 to 15% by weight in total of MgO and CaO, 10 to 20% by weight in total of $Na_2O$ and $K_2O$, and 0.2 to 5.0% by weight of $B_2O_3$; and as coloring components, 0.5 to 1.0% by weight, in terms of $Fe_2O_3$, of total iron oxide having a ratio of FeO based on the total iron oxide of 0.20 to 0.40, 0.2 to 2.0% by weight of $CeO_2$, and 0 to 1.0% by weight of $TiO_2$, and ultraviolet and infrared radiation absorbing glass comprising, as basic glass components, 65 to 80% by weight of $SiO_2$, 0 to 5% by weight of $Al_2O_3$, 0 to 10% by weight of MgO, 5 to 15% by weight of CaO, 10 to 18% by weight of $Na_2O$, 0 to 5% by weight of $K_2O$, 5 to 15% by weight in total of MgO and CaO, 10 to 20% by weight in total of $Na_2O$ and $K_2O$, and 0.5 to 5.0% by weight of $B_2O_3$; and, as coloring components, 0.5 to 1.0% by weight, in terms of $Fe_2O_3$, of total iron oxide having a ratio of FeO based on the total iron oxide of 0.20 to 0.40, 0.2 to 1.2% by weight of $CeO_2$, and 0 to 1.0% by weight of $TiO_2$.

17 Claims, No Drawings

ULTRAVIOLET AND INFRARED RADIATION ABSORBING GLASS

FIELD OF THE INVENTION

This invention relates to ultraviolet and infrared radiation absorbing (hereinafter sometimes referred to as "UV- and IR-absorbing") glass having a green tint.

BACKGROUND OF THE INVENTION

In order to meet the demand for the protection of the interior trim of automobiles against deterioration, which has been increasing with the recent trend to luxury of the interior trim, and to reduce the load of air conditioning, green-tinted glass endowed with ultraviolet (UV) and infrared (IR) absorbing power has recently been proposed as window glass of automobiles.

For example, green-tinted glass having a UV transmission of not more than about 38%, a total solar energy transmission of not more than about 46% and, for securing an outside view, a visible light transmission of at least 70% is known. There is a tendency that green-tinted glass having a bluish green tint is preferred for use in automobiles.

It is known that reduction in total solar energy transmission can be achieved by increasing the absolute amount of ferrous oxide (FeO). This approach has been taken in most conventional IR-absorbing glasses.

Various proposals have hitherto been made with respect to reduction of UV transmission. For example, the green-tinted UV- and IR-absorbing glass disclosed in JP-A-3-187946 (the term "JP-A" as used herein means an "unexamined published Japanese patent application") is characterized by containing cerium oxide and titanium oxide. In detail, the glass disclosed has a basic composition containing 65 to 75% by weight of $SiO_2$, 0 to 3% by weight of $Al_2O_3$, 1 to 5% by weight of MgO, 5 to 15% by weight of CaO, 10 to 15% of $Na_2O$, and 0 to 4% by weight of $K_2O$ and contains, as coloring components, 0.51 to 0.96% by weight of $Fe_2O_3$, a ratio of FeO based on the total iron oxide (hereinafter sometimes referred to as "FeO/T-$Fe_2O_3$", where T-$Fe_2O_3$ represents the total iron oxide in terms of $Fe_2O_3$) of 0.23 to 0.29, 0.2 to 1.4% by weight of $CeO_2$, and 0 to 0.85% by weight of $TiO_2$.

The green-tinted UV-absorbing glass disclosed in JP-A-6-56466 comprises a soda-lime-silica basic glass composition containing, as coloring components, 0.53 to 0.70% by weight, in terms of $Fe_2O_3$, of total iron oxide having an FeO/T-$Fe_2O_3$ ratio of 0.30 to 0.40, 0.5 to 0.8% by weight of $CeO_2$, and 0.2 to 0.4% by weight of $TiO_2$.

The green-tinted UV-absorbing glass disclosed in JP-A-6-191880 comprises a soda-lime-silica basic glass composition containing, as coloring component, 0.75% by weight or more, in terms of $Fe_2O_3$, of total iron oxide having an FeO/T-$Fe_2O_3$ ratio of 0.22 to 0.29 and 0.8 to 1.2% by weight of $CeO_2$.

However, glass endowed with UV absorbing power by introducing cerium oxide in a relatively high concentration as described above involves increased material cost due to the high cost of cerium sources.

In this regard, UV-absorbing glass having a reduced cerium oxide content has also been proposed. For example, JP-A-4-231347 discloses green-tinted UV-absorbing glass comprising a soda-lime-silica basic glass composition and containing, as coloring components, more than 0.85% by weight, in terms of $Fe_2O_3$, of total iron oxide having an FeO/T-$Fe_2O_3$ ratio of 0.275 or smaller and less than 0.5% by weight of $CeO_2$.

The above-mentioned conventional UV- and IR-absorbing glass owes its UV absorbing characteristics to UV absorption by $Fe_2O_3$, $CeO_2$ and $TiO_2$ and interactions among them. However, these components exhibit light absorption over a wavelength region not only including the UV region but extending to the visible region. Therefore, addition of these coloring components in an attempt to enhance UV absorption is accompanied by a reduction in transmission in the shorter visible wavelength region, resulting in yellowing of the glass.

The present invention has been made in the light of the above-described problems associated with the conventional techniques.

SUMMARY OF THE INVENTION

An object of the invention is to provide a UV- and IR-absorbing glass which has excellent UV- and IR-absorbing power and is free from the yellowness of glass that is unfavorable, particularly for use in automobiles.

The above and other objects and effects of the present invention will be apparent from the following description.

The prevent invention in its first embodiment relates to UV- and IR-absorbing glass comprising, as basic glass components, 65 to 80% by weight of $SiO_2$,
0 to 5% by weight of $Al_2O_3$,
0 to 10% by weight of MgO,
5 to 15% by weight of CaO,
10 to 18% by weight of $Na_2O$,
0 to 5% by weight of $K_2O$,
5 to 15% by weight in total of MgO and CaO,
10 to 20% by weight in total of $Na_2O$ and $K_2O$, and
0.2 to 5.0% by weight of $B_2O_3$; and as coloring components, 0.5 to 1.0% by weight, in terms of $Fe_2O_3$, of total iron oxide having a ratio of FeO based on the total iron oxide (FeO/T-$Fe_2O_3$ ratio) of 0.20 to 0.40,
0.2 to 2.0% by weight of $CeO_2$, and
0 to 1.0% by weight of $TiO_2$.

The present invention in its second embodiment relates to UV- and IR-absorbing glass comprising, as basic glass components, 65 to 80% by weight of $SiO_2$,
0 to 5% by weight of $Al_2O_3$,
0 to 10% by weight of MgO,
5 to 15% by weight of CaO,
10 to 18% by weight of $Na_2O$,
0 to 5% by weight of $K_2O$,
5 to 15% by weight in total of MgO and CaO,
10 to 20% by weight in total of $Na_2O$ and $K_2O$, and
0.5 to 5.0% by weight of $B_2O_3$; and, as coloring components, 0.5 to 1.0% by weight, in terms of $Fe_2O_3$, of total iron oxide having a ratio of FeO based on the total iron oxide (FeO/T-$Fe_2O_3$ ratio) of 0.20 to 0.40,
0.2 to 1.2% by weight of $CeO_2$, and
0 to 1.0% by weight of $TiO_2$.

DETAILED DESCRIPTION OF THE INVENTION

The UV- and IR-absorbing glass according to the first embodiment preferably contains 0.5 to 0.7% by weight, in terms of $Fe_2O_3$, of total iron oxide having an $FeO/T\text{-}Fe_2O_3$ ratio of 0.30 to 0.40 and 0.5 to 2.0% by weight of $CeO_2$ as coloring components. Still more preferably the glass contains 0.5 to 5.0% by weight of $B_2O_3$ and, as coloring components, 0.5 to 1.5% by weight of $CeO_2$ and 0 to 0.5% by weight of $TiO_2$.

It is also preferable that the UV- and IR-absorbing glass of the first embodiment contains, as coloring components, 0.6 to 1.0%, in terms of $Fe_2O_3$, of total iron oxide having an $FeO/T\text{-}Fe_2O_3$ ratio of 0.20 to 0.35 and 0.5 to 2.0% by weight of $CeO_2$. Still more preferably the glass contains 0.5 to 5.0% by weight of $B_2O_3$ and, as coloring components, 0.5 to 1.5% by weight of $CeO_2$ and 0 to 0.5% by weight of $TiO_2$.

The UV- and IR-absorbing glass according to the second embodiment of the invention preferably contains, as coloring components, 0.6 to 1.0% by weight, in terms of $Fe_2O_3$, of total iron oxide having an $FeO/T\text{-}Fe_2O_3$ ratio of 0.20 to 0.35, 0.5 to 1.2% by weight of $CeO_2$, and 0 to 0.3% by weight of $TiO_2$.

It is also preferable that the UV- and IR-absorbing glass of the second embodiment contains, as coloring components, 0.5 to 0.7% by weight, in terms of $Fe_2O_3$, of total iron oxide having an $FeO/T\text{-}Fe_2O_3$ ratio of 0.30 to 0.40, 0.2 to 0.7% by weight of $CeO_2$, and 0.5 to 1.0% by weight of $TiO_2$.

Further, the UV- and IR-absorbing glass according to the first and second embodiments, when it has a thickness of 4 mm, preferably has a visible light transmission of 70% or more as measured in a wavelength region of 380 to 770 nm with the CIE standard illuminant A; a dominant wavelength of 495 to 525 nm and an excitation purity of 2.0 to 3.5% as measured in a wavelength region of 380 to 770 nm with the CIE standard illuminant C; a total solar energy transmission of less than 48% as measured in a wavelength region of 300 to 2,100 nm; and a total UV transmission of less than 30% as measured in a wavelength region of 300 to 400 nm.

The grounds for limitations of the basic glass composition of the UV- and IR-absorbing glass according to the first and second embodiments are explained below. All the percents are given by weight.

$SiO_2$ is a main component forming the basic structure of glass. If its content is less than 65%, the glass has reduced durability. If it exceeds 80%, the composition is difficult to melt.

$Al_2O_3$ serves to improve durability of glass. If its content exceeds 5%, the composition is difficult to melt. A preferred $Al_2O_3$ content is from 0.1 to 2%.

MgO and CaO both serve to improve durability of glass and to control the liquidus temperature and viscosity at the time of glass forming. If the MgO content exceeds 10%, the liquidus temperature rises. If the CaO content is less than 5% or higher than 15%, the liquidus temperature rises. If the total content of MgO and CaO is less than 5%, the resulting glass has deteriorated durability. If it exceeds 15%, the liquidus temperature rises.

$Na_2O$ and $K_2O$ are used as glass melting accelerators. If the $Na_2O$ content is less than 10%, or if the total content of $Na_2O$ and $K_2O$ is less than 10%, the effect of melting acceleration is weak. If the $Na_2O$ content exceeds 18%, or if the total content of $Na_2O$ and $K_2O$ exceeds 20%, durability is reduced. It is unfavorable that the $K_2O$ content exceeds 5% because it is more expensive than $Na_2O$.

While $B_2O_3$ is a component generally used for improvement of durability of glass and also as a melting aid, it is used in this invention as an essential component functioning to enhance UV absorption. The UV absorption enhancing action of $B_2O_3$ has not been reported to date and was revealed for the first time in the present invention. Addition of $B_2O_3$ brings about little adverse effect on tint of glass, which has been observed with conventional techniques of UV absorption enhancement, i.e., the light absorption effect is exerted over the visible region. Therefore, addition of $B_2O_3$ makes it feasible to reduce UV transmission while minimizing the yellowing effect that is unfavorable to glass for automobiles.

In the first embodiment of the invention, the $B_2O_3$ content ranges from 0.2 to 5.0%. If it is less than 0.2%, the function of enhancing UV absorption would be insufficient. If it exceeds 5.0%, exertion of the light transmission reducing effect would be extended over the visible region. It follows not only that the tint tends to be yellow-tinted but that volatilization of $B_2O_3$ on forming would cause troubles. Accordingly, the upper limit of the $B_2O_3$ content should be 5.0%. A preferred range is from 1.0 to 3.0%.

In the second embodiment of the invention, the $B_2O_3$ content ranges from 0.5 to 5.0%. If it is less than 0.5%, the function of enhancing UV absorption would be insufficient. If it exceeds 5.0%, exertion of the UV light transmission reducing effect would be extended over the visible region. It follows not only that the tint tends to be yellow-tinted but that volatilization of $B_2O_3$ on forming would cause troubles. Accordingly, the upper limit of the $B_2O_3$ content should be 5.0%. A preferred range is from 1.0 to 3.0%.

Iron oxide is present in glass in the forms of $Fe_2O_3$ and FeO. $Fe_2O_3$ is a component serving to absorb UV together with $CeO_2$ and $TiO_2$, while the FeO is a component serving to absorb heat rays.

In the first embodiment of the invention, the total iron oxide content ranges from 0.5 to 1.0% in terms of $Fe_2O_3$. If it is less than 0.5%, the UV- and IR-absorbing effects are insufficient for obtaining desired optical characteristics. If it exceeds 1.0%, on the other hand, a desired visible light transmission is not secured. Additionally, production problems, such as increase of production loss at the color change, would occur.

In order to obtain a desired total solar energy absorption, it is important that the $FeO/T\text{-}Fe_2O_3$ ratio should be at least 0.20 with the total iron oxide content falling within the above specific range. However, if the ratio exceeds 0.40, the IR absorbing action of FeO prevents the penetration of heat into the body of molten glass and the melting process will become increasingly difficult. Besides, a desired visible light transmission cannot be secured.

$CeO_2$ and $TiO_2$ are added as components for enhancing UV absorption. In the first embodiment of the invention, the $CeO_2$ content ranges from 0.2 to 2.0%. If it is less than 0.2%, the UV absorbing effect is insufficient. If it exceeds 2.0%, the cost of glass production increases as stated above. The $TiO_2$ content is from 0 to 1.0%. If it exceeds 1.0%, the absorption of the shorter wavelength side of visible light becomes excessive, which causes yellowing, resulting in the failure of obtaining a desired visible light transmission and a desired dominant wavelength.

Where the total iron oxide content is 0.5 to 0.7% within the above specified range, it is preferable that the $FeO/T\text{-}Fe_2O_3$ ratio be 0.30 to 0.40 and the $CeO_2$ content be 0.5 to 2.0%. It is still more preferable that the $CeO_2$ content be 0.5 to 1.5% and the $TiO_2$ content be 0 to 0.5%.

Where the total iron oxide content is 0.6 to 1.0% within the above range, it is preferable that the $FeO/T\text{-}Fe_2O_3$ ratio be 0.20 to 0.35 and the $CeO_2$ content be 0.5 to 2.0%. It is still more preferable that the $CeO_2$ content be 0.5 to 1.5%, and the $TiO_2$ content be 0 to 0.5%.

In the second embodiment of the invention, the total iron oxide content in terms of $Fe_2O_3$ also ranges from 0.5 to 1.0%. If it is less than 0.5%, the UV- and IR-absorbing effects are insufficient for obtaining desired optical characteristics. If it exceeds 1.0%, on the other hand, a desired visible light transmission is not secured. Additionally, production problems, such as increased production loss at the color change, would occur.

In order to obtain a desired total solar energy absorption, it is important that the $FeO/T-Fe_2O_3$ ratio should be at least 0.20 with the total iron oxide content falling within the above specific-range. However, if the ratio exceeds 0.40, the IR absorbing action of FeO prevents the penetration of heat into the body of molten glass and the melting process will become increasingly difficult. Besides, a desired visible light transmission cannot be secured.

In the second embodiment of the invention, the content of $CeO_2$, which is added as a component for enhancing UV absorption, ranges from 0.2 to 1.2%. If it is less than 0.2%, the UV absorbing effect is insufficient. If it exceeds 1.2%, the cost of glass production increases as stated above. The content of $TiO_2$, which is also a component for enhancing UV absorption, is from 0 to 1.0%. If it exceeds 1.0%, the absorption of the shorter wavelength side of visible light becomes excessive, which causes yellowing, resulting in the failure of obtaining a desired visible light transmission and a desired dominant wavelength.

Where the total iron oxide content is 0.6 to 1.0% within the above specific range, it is preferable that the $FeO/T-Fe_2O_3$ ratio be 0.20 to 0.35, the $CeO_2$ content be 0.5 to 1.2%, and the $TiO_2$ content be 0 to 0.3%.

Where the total iron oxide content is 0.5 to 0.7%, it is preferable that the $FeO/T-Fe_2O_3$ ratio be 0.30 to 0.40, the $CeO_2$ content be 0.2 to 0.7%, and the $TiO_2$ content be 0.5 to 1.0%.

The $CeO_2$ and $B_2O_3$ contents are preferably selected within the above-mentioned respective ranges in such a manner that when the $CeO_2$ content is relatively high, the $B_2O_3$ content is made relatively low, while when the former is relatively low, the latter is made relatively high. By making such a combination, further improved optical characteristics can be obtained.

If desired, the glass composition according to the present invention may further contain the following optional components in addition to the above-mentioned components as long as the green tint as aimed at is not impaired. That is, the glass may contain other coloring components, e.g., CoO, NiO, MnO, $V_2O_5$, $MoO_3$, etc., and $SnO_2$ as a reducing agent in a total amount of from 0 to 1%. In particular, CoO gives a blue tint and is therefore effective to prevent the glass from being yellow-tinted due to $Fe_2O_3$, $CeO_2$ or $TiO_2$ added in increased amounts. A preferred amount of CoO to be added ranges from 3 to 20 ppm.

The UV- and IR-absorbing glass of the invention has a green tint and exhibits high UV-absorption, high IR-absorption, and high visible light transmission.

The present invention will now be illustrated in greater detail by way of Examples below, but the present invention is not construed as being limited thereto.

EXAMPLES 1 TO 8

A typical soda-lime-silica glass batch was appropriately compounded with ferric oxide, titanium oxide, cerium oxide, cobalt oxide, boric anhydride, and a carboneous material as a reducing agent, and the resulting batch was melted at 1,500° C. for 4 hours in an electric furnace. The molten glass was cast on a stainless steel plate and slowly cooled to room temperature to obtain a glass plate having a thickness of about 6 mm. The glass plate was polished to prepare a 4 mm thick glass sample for evaluating optical characteristics.

A visible light transmission (YA) measured with the CIE standard illuminant A, a total solar energy transmission (TG), a UV transmission (Tuv), and a dominant wavelength (Dw) and an excitation purity (Pe) measured with the CIE standard illuminant C were obtained. As an additional measure for UV transmission, a UV transmission at 370 nm (T370), at which the change in transmission sensitively appears in the course of the steep rise from the absorption end of the transmission curve, was measured.

In Table 1 below are shown the $T-Fe_2O_3$ concentration, $FeO/T-Fe_2O_3$ ratio, $TiO_2$ concentration, $CeO_2$ concentration, $B_2O_3$ concentration, CoO concentration, and optical characteristics of the samples.

TABLE 1

|  | $T-Fe_2O_3$ (wt %) | $FeO/T-Fe_2O_3$ | $TiO_2$ (wt %) | $CeO_2$ (wt %) | $B_2O_3$ (wt %) | CoO (wt %) | YA (%) | TG (%) | Tuv (%) | T370 (%) | Dw (nm) | Pe (%) |
|---|---|---|---|---|---|---|---|---|---|---|---|---|
| Example 1 | 0.75 | 0.24 | 0 | 1.00 | 3.00 | 0 | 70.9 | 43.5 | 26.0 | 22.2 | 510.5 | 2.35 |
| Example 2 | 0.80 | 0.27 | 0 | 0.85 | 2.00 | 0 | 71.3 | 42.7 | 26.8 | 24.4 | 504.4 | 2.98 |
| Example 3 | 0.75 | 0.27 | 0.15 | 0.70 | 1.00 | 0 | 71.2 | 43.8 | 25.8 | 26.8 | 510.6 | 2.82 |
| Example 4 | 0.60 | 0.32 | 0.70 | 0.45 | 2.00 | 0.0008 | 71.0 | 43.7 | 29.2 | 28.5 | 502.7 | 2.94 |
| Example 5 | 0.60 | 0.33 | 0.80 | 0.40 | 1.00 | 0.0006 | 71.2 | 43.9 | 28.7 | 27.8 | 514.1 | 2.65 |
| Example 6 | 0.63 | 0.30 | 0.35 | 1.00 | 2.00 | 0 | 73.9 | 46.5 | 27.3 | 25.2 | 515.5 | 2.30 |
| Example 7 | 0.63 | 0.30 | 0.30 | 1.30 | 1.00 | 0 | 73.6 | 46.5 | 26.4 | 26.4 | 521.4 | 2.34 |
| Example 8 | 0.70 | 0.29 | 0.15 | 0.50 | 0.40 | 0 | 72.6 | 45.0 | 28.5 | 25.3 | 502.5 | 3.20 |
| Comparative Example 1 | 0.75 | 0.24 | 0 | 1.00 | 0 | 0 | 71.2 | 43.7 | 32.5 | 31.5 | 503.5 | 2.50 |
| Comparative Example 2 | 0.80 | 0.27 | 0 | 0.85 | 0 | 0 | 71.6 | 42.5 | 31.4 | 32.6 | 498.4 | 2.85 |
| Comparative Example 3 | 0.75 | 0.27 | 0.15 | 0.7 | 7.5 | 0 | 70.9 | 43.5 | 24.3 | 22.5 | 529.5 | 3.10 |

As is apparent from Table 1, all the samples of Examples 1 to 8 having a thickness of 4 mm had a visible light transmission (YA) of 70% or more as measured with the illuminant A, a dominant wavelength (Dw) of 495 to 525 nm and an excitation purity (Pe) of 2.0 to 3.5% as measured with the illuminant C, a total solar energy transmission (TG) of less than 48%, and a UV transmission (Tuv) of less than 30%, proving excellent in UV absorption. Accordingly, the glass of the Examples is expected to exhibit an excellent deterioration preventive effect on interior trim when used as window glass of vehicles, such as automobiles, or buildings.

COMPARATIVE EXAMPLES 1 TO 3

In Table 1 are also shown Comparative Examples. The glass samples of Comparative Examples 1 and 2 have the same composition as in Examples 1 and 2, respectively, except for containing no $B_2O_3$. As compared with the glass of Examples containing $B_2O_3$, the glass of Comparative Examples 1 and 2 have a higher UV transmission (Tuv), proving inferior in UV absorption.

The glass of Comparative Example 3 has the same composition as in Example 3 except for containing $B_2O_3$ in a concentration exceeding the upper limit specified in the invention. It is seen that the dominant wavelength of this glass is longer than that of the glass whose composition fall within the range of the invention (i.e., 495 to 525 nm), indicating yellowness of the tint As has been fully described, the present invention makes it possible to produce UV- and IR-absorbing glass having excellent UV- and IR-absorption without yellowing the tint.

Further, because the UV- and IR-absorbing glass of the invention has a bluish green tint while exhibiting high UV absorbing power, it is highly effective in prevention of interior trim or decoration, and the like from deterioration or browning when applied as glass panes of automobiles or buildings.

While the invention has been described in detail and with reference to specific examples thereof, it will be apparent to one skilled in the art that various changes and modifications can be made therein without departing from the spirit and scope thereof.

What is claimed is:

1. Ultraviolet and infrared radiation absorbing glass comprising, as basic glass components,
    65 to 80% by weight of $SiO_2$
    0 to 5% by weight of $Al_2O_3$,
    0 to 10% by weight of MgO,
    5 to 15% by weight of CaO,
    10 to 18% by weight of $Na_2O$,
    0 to 5% by weight of $K_2O$,
    5 to 15% by weight in total of MgO and CaO,
    10 to 20% by weight in total of $Na_2O$ and $K_2O$, and
    0.2 to 5.0% by weight of $B_2O_3$; and, consisting essentially of as coloring components,
    0.5 to 1.0% by weight, in terms of $Fe_2O_3$, of total iron oxide having a ratio of FeO based on the total iron oxide of 0.20 to 0.40,
    0.2 to 2.0% by weight of $CeO_2$, and
    0 to 1.0% by weight of $TiO_2$, wherein said glass has an ultraviolet transmission of less than 30%, when said glass has a thickness of 4 mm.

2. Ultraviolet and infrared radiation absorbing glass as claimed in claim 1, wherein said glass consists essentially of as coloring components,
    0.5 to 0.7% by weight, in terms of $Fe_2O_3$, of total iron oxide having a ratio of FeO based on the total iron oxide of 0.30 to 0.40, and
    0.5 to 2.0% by weight of $CeO_2$.

3. Ultraviolet and infrared radiation absorbing glass as claimed in claim 1, wherein said glass consists essentially of as coloring components,
    0.6 to 1.0% by weight, in terms of $Fe_2O_3$, of total iron oxide having a ratio of FeO based on the total iron oxide of 0.20 to 0.35, and
    0.5 to 2.0% by weight of $CeO_2$.

4. Ultraviolet and infrared radiation absorbing glass as claimed in claim 1, wherein said glass contains
    0.5 to 5.0% by weight of $B_2O_3$ and coloring components which consist essentially of
    0.5 to 1.0% by weight, in terms of $Fe_2O_3$, of total iron oxide having a ratio of FeO based on the total iron oxide of 0.20 to 0.40,
    0.5 to 1.5% by weight of $CeO_2$ and
    0 to 0.5% by weight of $TiO_2$.

5. Ultraviolet and infrared radiation absorbing glass comprising, as basic glass components,
    65 to 80% by weight of $SiO_2$
    0 to 5% by weight of $Al_2O_3$,
    0 to 10% by weight of MgO,
    5 to 15% by weight of CaO,
    10 to 18% by weight of $Na_2O$,
    0 to 5% by weight of $K_2O$,
    5 to 15% by weight in total of MgO and CaO,
    10 to 20% by weight in total of $Na_2O$ and $K_2O$, and
    0.5 to 5.0% by weight of $B_2O_3$; and, consisting essentially of as coloring components,
    0.5 to 1.0% by weight, in terms of $Fe_2O_3$, of total iron oxide having a ratio of FeO based on the total iron oxide of 0.20 to 0.40,
    0.2 to 1.2% by weight of $CeO_2$, and
    0 to 1.0% by weight of $TiO_2$, wherein said glass has an ultraviolet transmission of less than 30%, when said glass has a thickness of 4 mm.

6. Ultraviolet and infrared radiation absorbing glass as claimed in claim 5, wherein said glass consists essentially of as coloring components,
    0.6 to 1.0% by weight, in terms of $Fe_2O_3$, of total iron oxide having a ratio of FeO based on the total iron oxide of 0.20 to 0.35,
    0.5 to 1.2% by weight of $CeO_2$, and
    0 to 0.3% by weight of $TiO_2$.

7. Ultraviolet and infrared radiation absorbing glass as claimed in claim 5, wherein said glass consists essentially of as coloring components,
    0.5 to 0.7% by weight, in terms of $Fe_2O_3$, of total iron oxide having a ratio of FeO based on the total iron oxide of 0.30 to 0.40,
    0.2 to 0.7% by weight of $CeO_2$, and
    0.5 to 1.0% by weight of $TiO_2$.

8. Ultraviolet and infrared radiation absorbing glass as claimed in claim 1, wherein said glass has a visible light transmission of 70% or more as measured with the CIE standard illuminant A, when said glass has a thickness of 4 mm.

9. Ultraviolet and infrared radiation absorbing glass as claimed in claim 5, wherein said glass has a visible light transmission of 70% or more as measured with the CIE standard illuminant A, when said glass has a thickness of 4 mm.

10. Ultraviolet and infrared radiation absorbing glass as claimed in claim 1, wherein said glass has a dominant wavelength of 495 to 525 nm as measured with the CIE standard illuminant C, when said glass has a thickness of 4 mm.

11. Ultraviolet and infrared radiation absorbing glass as claimed in claim 5, wherein said glass has a dominant wavelength of 495 to 525 nm as measured with the CIE standard illuminant C, when said glass has a thickness of 4 mm.

12. Ultraviolet and infrared radiation absorbing glass as claimed in claim 1, wherein said glass has a solar radiation transmission of less than 48%, when said glass has a thickness of 4 mm.

13. Ultraviolet and infrared radiation absorbing glass as claimed in claim 5, wherein said glass has a solar radiation transmission of less than 48%, when said glass has a thickness of 4 mm.

14. Ultraviolet and infrared radiation absorbing glass as claimed in claim 1, wherein said glass has an excitation purity of 2.0 to 3.5% as measured with the CIE standard illuminant C, when said glass has a thickness of 4 mm.

15. Ultraviolet and infrared radiation absorbing glass as claimed in claim 5, wherein said glass has an excitation purity of 2.0 to 3.5% as measured with the CIE standard illuminant C, when said glass has a thickness of 4 mm.

16. Ultraviolet and infrared radiation absorbing green tint glass comprising, as basic glass components, 65 to 80% by weight of $SiO_2$
   0 to 5% by weight of $Al_2O_3$,
   0 to 10% by weight of MgO,
   5 to 15% by weight of CaO,
   10 to 18% by weight of $Na_2O$,
   0 to 5% by weight of $K_2O$,
   5 to 15% by weight in total of MgO and CaO,
   10 to 20% by weight in total of $Na_2O$ and $K_2O$, and
   0.2 to 5.0% by weight of $B_2O_3$; and, consisting essentially of as coloring components,
   0.5 to 1.0% by weight, in terms of $Fe_2O_3$, of total iron oxide having a ratio of FeO based on the total iron oxide of 0.20 to 0.40,
   0.2 to 2.0% by weight of $CeO_2$, and
   0 to 1.0% by weight of $TiO_2$, wherein said glass has an ultraviolet transmission of less than 30%, when said glass has a thickness of 4 mm.

17. Ultraviolet and infrared radiation absorbing green tint glass comprising, as basic glass components, 65 to 80% by weight of $SiO_2$
   0 to 5% by weight of $Al_2O_3$,
   0 to 10% by weight of MgO,
   5 to 15% by weight of CaO,
   10 to 18% by weight of $Na_2O$,
   0 to 5% by weight of $K_2O$,
   5 to 15% by weight in total of MgO and CaO,
   10 to 20% by weight in total of $Na_2O$ and $K_2O$, and
   0.5 to 5.0% by weight of $B_2O_3$; and, consisting essentially of as coloring components,
   0.5 to 1.0% by weight, in terms of $Fe_2O_3$, of total iron oxide having a ratio of FeO based on the total iron oxide of 0.20 to 0.40,
   0.2 to 2.0% by weight of $CeO_2$, and
   0 to 1.0% by weight of $TiO_2$, wherein said glass has an ultraviolet transmission of less than 30%, when said glass has a thickness of 4 mm.

* * * * *